Jan. 16, 1951     H. F. BENOIT     2,538,499
CYLINDER COUPLING
Filed April 30, 1946
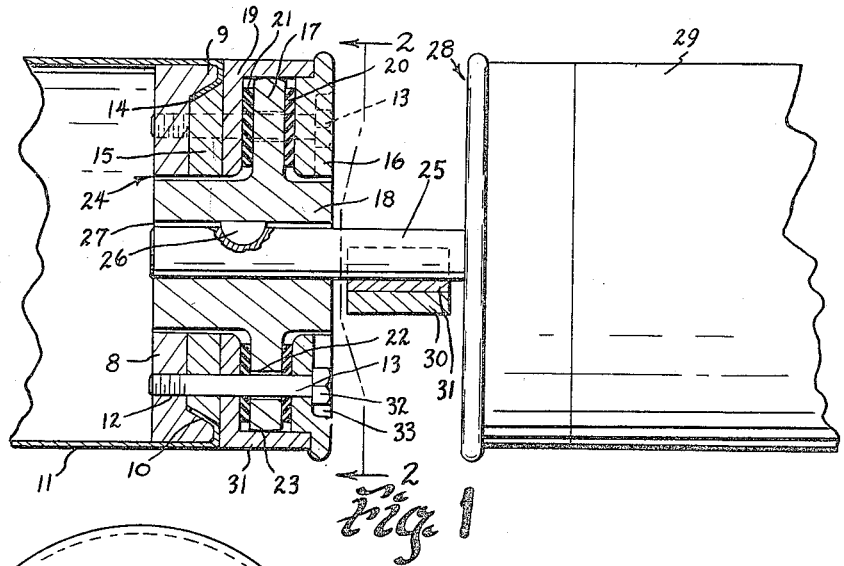
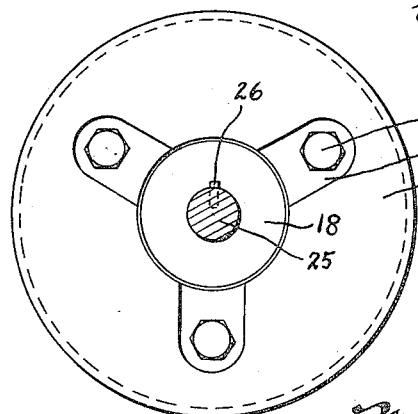
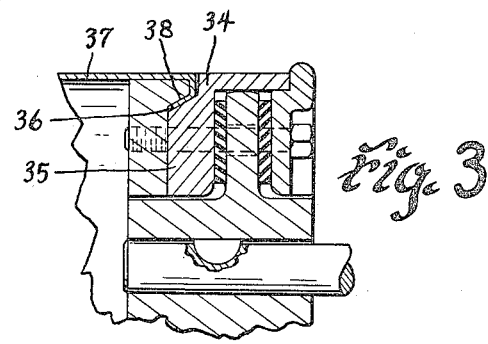
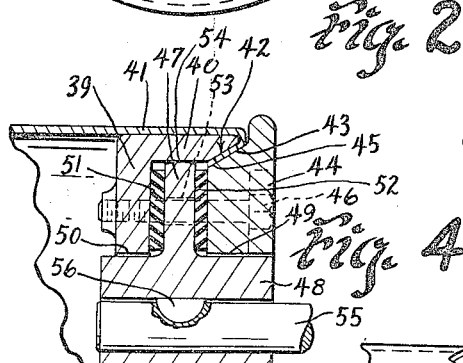
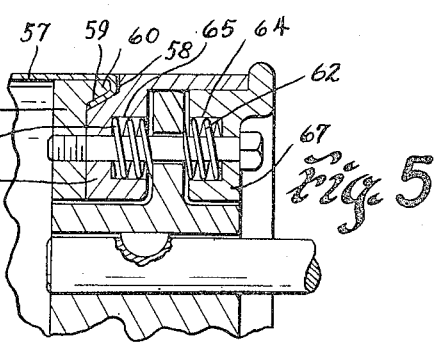
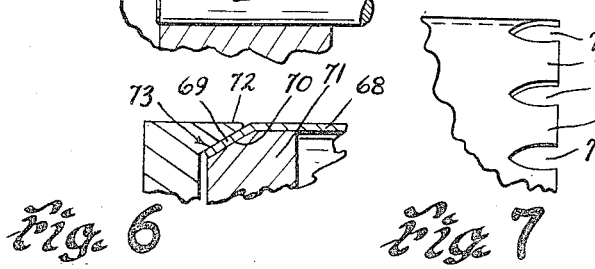
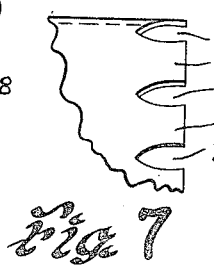
INVENTOR
HENRY F. BENOIT
BY
ATTORNEY Patented Jan. 16, 1951

2,538,499

UNITED STATES PATENT OFFICE 2,538,499

CYLINDER COUPLING

Henry F. Benoit, Charlton, Mass.

Application April 30, 1946, Serial No. 666,167

2 Claims. (Cl. 64—5)

This invention relates to improvements in cylinder couplings and method of making the same.

One of the principal objects of the invention is to provide an improved coupling and method of making the same for spindle driving cylinders such as are employed in wool spinning, mules, twisters, spinning frames and the like.

Another object is to provide improved coupling means for cylinders of the above character which will afford ease of removal or replacement of parts independently of other such cylinders in combination with means for affording ease of repairing the bearings for the stub shafts of such cylinder while compensating for any axial displacement or decentering of the stub shaft during the rotation of the cylinders and which might be introduced by the assembling of the parts with each other.

Another object is to provide a coupling or head for cylinders of the above character whereby no solder connections are required for joining the parts, which will permit ease of assembly of the parts and which will not require accurate control of alignment of the stub shaft with the cylinder axis when the parts are joined with each other and which embodies means for obviating any tendency of the parts to break during the operation of the cylinders.

Another object is to provide a cylinder coupling of the above character whereby the operating surfaces of the cylinders are continuous and smooth and will avoid danger of cutting or wearing the spindle drive cords surrounding and moving longitudinally of said cylinders during the rotation thereof.

Another object is to provide a coupling of the above character wherein the stub shaft is yieldingly united with the coupling parts during the assembly thereof.

Other objects and advantages of the invention will become apparent from the following description taken in conjunction with the accompanying drawings. It is to be understood that many changes may be made in the details of construction, arrangement of parts and methods shown and described without departing from the spirit of the invention as expressed in the accompanying claims. I, therefore, do not wish to be limited to the exact details of construction, arrangement of parts and methods shown and described as the preferred forms only have been given by way of illustration.

Referring to the drawings:

Fig. 1 is a fragmentary side elevational view of the coupling embodying the invention with a portion thereof shown in cross-section;

Fig. 2 is a sectional view taken as on line 2—2 of Fig. 1 and looking in the direction indicated by the arrows;

Fig. 3 is a fragmentary sectional view of a modified form of the invention;

Fig. 4 is a view generally similar to Fig. 3 of a further modification;

Fig. 5 is a view generally similar to Fig. 4 of a still further modification;

Fig. 6 is a fragmentary sectional view of a further modification; and

Fig. 7 is a fragmentary end view of the cylinder prior to its being assembled with the coupling head. With prior art cylinder couplings or heads it has been usual to utilize a head having a portion fitting within the end of the cylinder and solder connected with said cylinder and having a clamp portion extending from said head inwardly of the cylinder thereby requiring that the cylinder have an opening through its outer surface whereby a suitable wrench may be extended through said opening to tighten the clamp on the stub shaft.

In use several cylinders are connected in longitudinal axial relation with each other by such cylinder heads and stub shafts.

If a part should break in the cylinder head or the stub shaft bearing should become worn so as to require replacement of a part or parts with prior art constructions, it has been necessary to remove the entire cylinder as well as the adjacent cylinder thereby requiring discontinuance of the operation of the machine. It is quite apparent that with solder connections special heating devices were required to melt the solder and, in order to disassemble the head from the cylinder a wrench or the like had to be extended through the opening or openings therein in order to loosen the clamp means.

In many instances in the past the cylinder surrounding the opening would be bent due to slippage of the wrench or like and thereby causing a roughened or sharp protrusion to extend outwardly of the surface of the cylinder in the vicinity of the opening.

The above difficulties are entirely overcome by the present invention through the provision of a coupling or head which may be readily attached or detached from the spindle and attached to the cylinder without requiring any wrench opening to be formed in the cylinder and without requiring any solder connections.

A further advantage of the present invention is that the parts may be quickly and easily disassembled for replacement of parts without disturbing the function or operation of the adjacent cylinders and will insure a positive driving connection of said cylinders and obviate any surface irregularities or cutting edges which might cause the driving cords to be cut or worn before performing the full extent of their usefulness.

A still further advantage of the present invention is that means is provided in the coupling head assembly which if the longitudinal axis of the stub shaft should be disaligned or be disposed at a slight angle with respect to the longitudinal axis of the cylinder during the assembling of the parts, danger of breakage of the stub shaft during the rotation of the cylinder is obviated. This has overcome one of the major difficulties of prior arrangements and obviates the necessity of extreme care and skill which would be required in accurately assembling the longitudinal axis of the stub shaft with the longitudinal axis of the cylinder in order to avoid such breakage.

Referring more particularly to the drawings wherein like characters of reference designate like parts throughout the several views, the device embodying the invention comprises a disc 8 having a circumferential flange portion 9 extending outwardly of one side thereof and provided with a cone-shaped inner surface 10. The disc 8 is so dimensioned as to fit within the bore of the cylinder 11 and is provided with threaded openings 12 adapted to receive suitable coupling bolts 13. The adjacent end of the cylinder 11 is turned inwardly as shown at 14 to overlie the cone-shaped inner surface 10 of the circumferential flange 9.

A clamp plate 15 having a peripheral frustroconical edge surface shape is adapted to fit within the flange 9 and is so dimensioned as to introduce a wedging action on the inturned portion 14 of the cylinder 11 between the inner conical surface 10 and the circumferential edge of the plate 15. This clamping action is introduced by tightening the bolts 13 which extend through aligned openings formed in a head plate 16, flange 17 formed on an inner sleeve or bearing 18, a shouldered intermediate member 19 in which the flange 17 is seated, the plate 15 and which are threadedly connected with the disc 8. The shouldered intermediate member 19, during the tightening of the bolts 13, is adapted to cause the plate 15 to be urged into binding relation with the inturned edge of the cylinder 11. Between the head plate 16, flange 17 and the intermediate portion 19 there is positioned resilient discs 20 and 21, respectively, formed of any suitable material such as rubber, synthetic rubber or the like and which will permit the flange to be displaced slightly toward or away from the head plate and intermediate member 19. It is particularly pointed out that the openings 22 in said flange 17, and through which the bolts 13 are extended, are of a diameter larger than the bolts 13 or may be formed to a greater dimension only in a direction radially of the flange with the opposed radial walls engaging the bolts or being spaced from each other an amount substantially equal to the diameter of the bolts 13. The peripheral surface 23 of the flange 17 is provided with a curvature of a radius substantially equal to half the diameter of the flange and in the direction of the longitudinal axis of the bearing 18 so as to function cooperatively with the openings 22 in permitting the bearing 18 to be tilted slightly during the rotation thereof if necessary. It is also pointed out that the bearing 18 lies within centrally aligned openings 24 which are formed in the respective members 8, 15, 19 and 16 and which are of a diameter greater than the diameter of the bearing 18. The bearing 18 has a central bore in which is extended the stub shaft 25. The stub shaft 25 is provided with a woodruff key 26 which is fitted within a slot in said shaft and which has a portion fitting within a longitudinal groove 27 formed in the bore of the bearing locking said bearing and shaft together.

The stub shaft 25 is similarly connected with the head 28 of an adjacent cylinder 29 so that when one of said cylinders is rotated the other will be simultaneously rotated. The stub shaft 25 is supported by a conventional bearing 30 having a lining 31 of bronze or other suitable material.

It is particularly pointed out that the diameter of the flange 17 is such as to fit relatively snug inwardly of the shouldered ends 31 of the intermediate member 19 so as to hold the bearing 18 against lateral play while the curved contour of the end surface of the flange 17 permits tilting of the bearing through the yielding action of the resilient washers 20 and 21 as the cylinders 11 and 29 are rotated. The clearance between the bearing 18 and the inner walls of the aligned openings 24 and the clearance between the openings 22 and the respective bolts 13 further permits the said tilting movement thereby eliminating torsional strain on the stub shaft 25 during the rotation of the cylinders.

The heads 32 of the respective bolts 13 lie within channelled areas 33 formed in the side of the head plate 16 so as to position said heads inwardly or flush with the outer end surface of the head plate with the width of the channelled areas 33 being sufficient to permit a socket wrench to be placed over the head of the bolts for tightening or loosening the same.

In Fig. 3 there is illustrated a slightly modified form of the invention wherein instead of forming the coupling with a separate tapered plate member 15, as shown in Fig. 1, the intermediate member 34 is provided with an integral tapered projection 35 for wedging the inturned end 36 of the cylinder 37 inwardly of the tapered flange 38. The assembly is otherwise generally similar to that shown in Fig. 1 and functions in a similar manner.

In Fig. 4 there is illustrated a further modification comprising an inner perforated disc 39 having a shouldered portion 40 thereon of a diameter which fits snugly within the cylinder 41. The shouldered portion 40 is provided with a tapered inner surface 42 over which the end 43 of the cylinder 41 is folded. A cap plate 44 having an integral tapered projection 45 is secured in position by suitable bolts or the like 46 which exert a clamping force of the tapered surface 45 on the inturned end 43 of the cylinder 41. The shouldered portion 40 forms a housing between the disc 39 and the cap plate 44 for the flange 47 carried by the sleeve 48. The sleeve 48 lies within aligned openings 49 and 50 formed in the cap plate 44 and disc 39 and is of a smaller diameter than the diameter of the openings 49 and 50 so as to allow clearance between the sleeve 48 and the openings 49 and 50. The flange 47 lies between resilient washers 51 and 52 formed of rubber, synthetic rubber or other suitable means whereby the flange 47 will be resiliently supported between the disc 39 and the cap plate 44. The flange 47 is provided with openings 53 through which the bolts or the like 46 extend with the said openings 53 being of a diameter larger than the bolts to permit side deflection of the flange 47.

The peripheral surface 54 of the flange 47 is curved in the direction of the thickness thereof about a radius substantially centrally of the diameter of the flange and the said diameter of the flange is of a diameter such as to fit within the shouldered portion 40.

Internally of the sleeve 48 there is mounted the stub shaft 55 which is keyed to the sleeve 48 by means of a Woodruff key or the like 56.

With the above arrangement any slight off-axial relation of the stub shaft 55 or disalignment of the axis of the stub shaft with the longitudinal axis of the cylinder 41 may be compensated for by the yielding characteristics of the resilient washers 51 and 52 thereby relieving torsional strain on the stub shaft 55 during the rotation of the cylinder.

In Fig. 5 there is illustrated a still further modification wherein the cylinder 57 has its end 58 turned inwardly to overlie the tapered surface 59 of an integral flange 60 formed on the disc 61 similar to the construction illustrated in Fig. 3. The remaining parts of the device are generally similar to those of Fig. 3 with the exception that instead of utilizing resilient discs such as shown at 20 and 21 in Fig. 1 coil springs or the like 62 and 63 are used. In this instance the coil springs lie within suitable counterbores 64 and 65 formed in the respective members 66 and 67 simulating the members 16 and 19 of Fig. 1. It is to be understood that either the resilient discs or coil springs or the like such as shown in Fig. 5 may be used alternately with any of the structures shown in the various figures.

If desired, as shown in Fig. 6, the various constructions shown throughout the drawings may have the cylinder members such as shown at 68 provided with an end 69 overlying an inwardly tapered peripheral edge 70 of the inner disc 71 and the various cap plates or intermediate shouldered discs may have an integral flange portion 72 with an inwardly tapered surface 73 thereon shaped to engage the end 69 to bind and lock the same in position. This is just the reverse of the arrangement shown in the previous views.

To aid in turning the ends of the various cylinders inwardly over the tapered surfaces of the associated parts as shown in the various figures of the drawings the said end may be provided with a plurality of notches 74 as shown in Fig. 7 thereby providing intermediate sections 75 which may be easily bent to overlie the tapered binding surfaces of the adjoining parts.

In the foregoing constructions set forth in the drawings it is particularly pointed out that the various sleeves in which the stub shafts are mounted are each provided with an integral flange resiliently supported so as to permit the stub shaft and sleeve to have free movement in directions tilting relative to the longitudinal axis of the stub shaft during the rotation of the cylinders. In this manner the stub shafts are relieved of torsional strain, which, as has been found in the past, will cause said shafts to break during the rotation of the cylinders particularly when slightly out of alignment therewith.

In constructions where the cylinders have an end turned inwardly so as to be clampingly secured to the head carrying the stub shaft and where such tapered connections do not insure positive alignment of the parts when assembled with each other, it is particularly desirable that the stub shafts be supported for free tilting movement such as shown in the various constructions. While supported for free tilting movement the said stub shafts do afford driving means for rotation of the cylinders through their keyed relation with the sleeves and through the interconnection of the integral flanges of the sleeves with the bolts used in securing the parts of the head together and which simultaneously introduce the clamping force for locking the inturned ends of the cylinders between the members having the tapered surfaces thereon.

The above arrangement, therefore, overcomes all of the difficulties inherent with prior structures of this nature and accomplishes all of the objects and advantages of the invention.

Having described my invention, I claim:

1. In a device of the character described, the combination of a cylinder formed of relatively thin material, a disc-like member having an edge portion lying within one end of said cylinder and having a tapered portion over which the end of the cylinder is positioned, a second disc-like member having a tapered portion fitting with the tapered portion of the first disc-like member to engage the end of the cylinder lying therebetween, one of said members having an annular portion extending outwardly to one side of the plane thereof, said disc-like members each having a central opening therein and a plurality of outwardly spaced aligned openings, a bearing member lying within said central openings and of a diameter less than said openings, said bearing member having a peripheral flanged portion thereon lying within the annular portion and having slightly enlarged openings therein aligned with the outwardly spaced openings of said disc-like members, an outer cap-like portion overlying the free edge of the annular portion and having a central opening therein aligned with the central openings of the disc-like members and outwardly spaced openings aligned with the outwardly spaced openings of said members, resilient means on the opposed sides of said flanged portion and between said portion and the side surfaces of the members adjacent said flanged portion and connecting means extending through said aligned openings for connecting said members together whereby the bearing will be yieldingly supported and the tapered surface portions will bindingly hold the end of the cylinder.

2. In a device of the character described, the combination of a cylinder formed of relatively thin material, a disc-like member having an edge portion lying within one end of said cylinder and having an annular inwardly tapering surface over which the end of the cylinder is positioned, a second disc-like member having a peripherally tapered portion fitting within the tapered portion of the first disc-like member to engage the end of the cylinder lying therebetween, one of said members having an annular portion extending outwardly to one side of the plane thereof, said disc-like members each having a central opening therein and a plurality of outwardly spaced aligned openings, with said outwardly spaced openings in the member lying inwardly of the cylinder being threaded, a bearing member lying within said central openings and of a diameter less than said openings, said bearing member having a peripheral flanged portion thereon lying within the annular portion and having slightly enlarged openings therein aligned with the outwardly spaced openings of said disc-like members, an outer cap-like portion overlying the free edge of the annular portion and having a central opening therein aligned with the central openings of the disc-like members and outwardly spaced openings aligned with the outwardly spaced openings of said members, resilient means on the opposed sides of said flanged portion and between said portion and the side surfaces of the members adjacent said flanged portion and connecting means extending through said aligned outwardly spaced openings and threadedly connected with the disc-like member inwardly of the cylinder whereby the bearing member will be yieldingly supported and the tapered surface portions will bindingly hold the end of the cylinder.

HENRY F. BENOIT.

REFERENCES CITED

The following references are of record in the file of this patent:

UNITED STATES PATENTS

| Number | Name | Date |
|---|---|---|
| 1,287,030 | Jones | Dec. 10, 1918 |
| 1,592,581 | Roberts | July 13, 1926 |
| 1,891,915 | Clark | Dec. 27, 1932 |
| 1,949,520 | Whisler | Mar. 6, 1934 |
| 2,204,953 | Wittmer | June 18, 1940 |
| 2,412,013 | Shade | Dec. 3, 1946 |